MICROWAVE FREQUENCY DOUBLING AND MIXING IN FERRITES
Filed June 6, 1957 3 Sheets-Sheet 1
FIG. 1
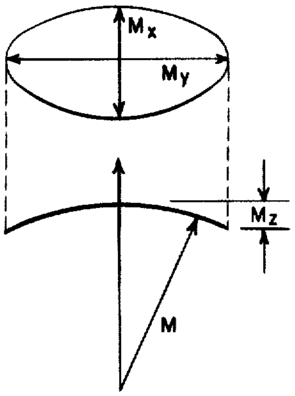
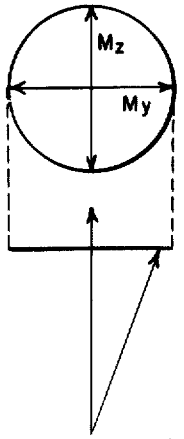
FIG. 2
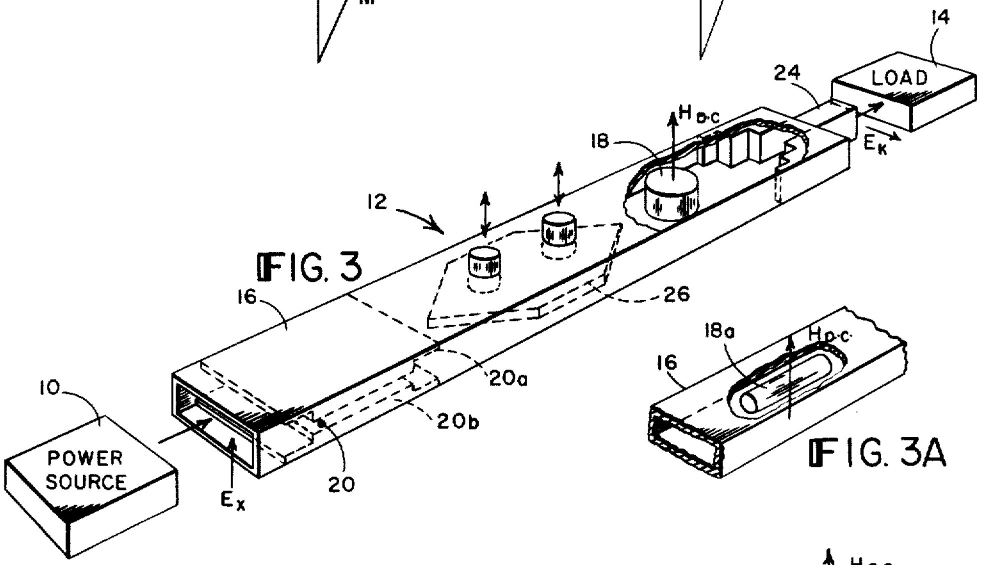
FIG. 3, FIG. 3A
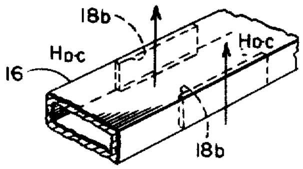
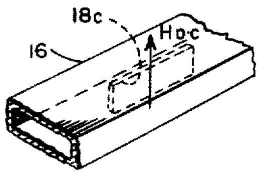
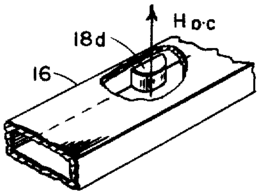
FIG. 3B FIG. 3C FIG. 3D
*INVENTORS.*
WESLEY P. AYRES,
JACK L. MELCHOR
and PERRY H. VARTANIAN, Jr.
BY Spencer E. Olson
ATTORNEY.

*INVENTORS.*
WESLEY P. AYRES,
JACK L. MELCHOR
and PERRY H. VARTANIAN, JR.
BY Spencer E. Olson
ATTORNEY.

*INVENTORS.*
WESLEY P. AYRES,
JACK L. MELCHOR
and PERRY H. VARTANIAN, JR.
BY Spencer E. Olson
ATTORNEY.

United States Patent Office 2,922,876

Patented Jan. 26, 1960

2,922,876

MICROWAVE FREQUENCY DOUBLING AND MIXING IN FERRITES

Wesley P. Ayres and Jack L. Melchor, Los Altos, and Perry H. Vartanian, Jr., Menlo Park, Calif., assignors, by mesne assignments, to Sylvania Electric Products Inc., Wilmington, Del., a corporation of Delaware Application June 6, 1957, Serial No. 664,121

15 Claims. (Cl. 250—20)

This invention relates to frequency changers, and is more particularly concerned with frequency conversion in ferrites at microwave frequencies. The instant application is a continuation-in-part of application Ser. No. 631,135, filed December 28, 1956, by Wesley P. Ayres, Jack L. Melchor and Perry H. Vartanian, entitled "Frequency Changer" and assigned to the assignee of the present application.

There is need in the microwave art for apparatus which can efficiently convert a microwave signal of fixed frequency and relatively high power to an output signal at a frequency which is an integral multiple of the input frequency. Doubling circuits, and circuits capable of producing other harmonics of an input signal, usually employing electron tubes, have previously been employed for frequency conversion, but where high powers are involved, particularly at frequencies in the kilomegacycle range, available electron tubes are not satisfactory.

The above-entitled application describes a system generally comprising a cavity resonator within which is placed a ferrite element which is subjected to a magnetic field, and means for coupling to the cavity the signal whose frequency it is desired to change. When the magnetic field component of the input signal is normal to the internal magnetic field in the ferrite, a second electromagnetic wave of different frequency is induced in the ferrite, the magnetic field component of the second wave being parallel to the internal magnetic field of the ferrite. The second harmonic of the input signal is predominantly produced (other integral multiples of the input signal are also present) and by employing an output coupling structure which will couple the desired harmonic and reject the fundamental and other harmonic frequencies, the desired harmonic may be coupled from the device.

More specifically, the earlier disclosed apparatus consisted of a box-like rectangular cavity having in one embodiment thereof a semi-circular ferrite disk mounted on one end wall and magnetized perpendicular to its plane. The fundamental signal was coupled to the cavity through an iris, and a wire loop encircled the ferrite disk to couple a double frequency signal to an output coaxial line. With this arrangement, and the parameters selected to frequency double from 3175 to 6350 megacycles, it was possible to generate output signals of fractions of a milliwatt from a peak fundamental input power of several hundred watts, the output power being observed to closely follow a square law function of the input power over a wide range of power levels.

This arrangement clearly demonstrated and verified that a ferrite excited at high power levels will act as a frequency changer and generate output power at frequencies which are harmonics of the input frequency, particularly the second, and was satisfactory for some purposes. However, the fact that the cavity must be tuned to resonance and be matched to the power source, the bandwidth over which the device could be conveniently operated was very limited, particularly since the ferrite element itself affects both of these parameters.

Accordingly, it is an object of the present invention to provide improved apparatus for deriving from an input microwave signal of fixed frequency and relatively high power, an output signal whose frequency is an harmonic of the input frequency.

Another object of the invention is to provide a frequency changer capable of efficiently converting relatively high power microwave energy of one frequency to energy at a frequency which is an integral multiple of the input frequency.

Another object of the invention is to provide a frequency changer for high power microwave energy which is relatively insensitive to variations in frequency of the input signal.

The present invention is based (as was the earlier filed application) on the fact that frequency doubling occurs in ferrites by reason of the double frequency component of magnetization along the direction of the D.C. magnetizing field. Assuming no loss in the ferrite, the equation of motion for this component of magnetization may be written as $$\dot{m}_z=\gamma(m_xh_y-m_yh_x) \qquad (1)$$

where $h_x$ and $h_y$ are the radio frequency magnetic fields inside the ferrite; $m_x$, $m_y$ and $m_z$ are the radio frequency magnetizations of the ferrite; and $\gamma$ is 2.8 mc./oersted. A solution of the magnetic torque equation for the two components of magnetization normal to the D.C. magnetizing fields yields $$\begin{aligned}4\pi m_x&=Xh_x-jKh_y\\4\pi m_y&=jKh_x+Xh_y\end{aligned} \qquad (2)$$

where X and K are the usual elements of the tensor susceptibility of ferrites, as discussed, for example, in the article by C. L. Hogan, "The Ferromagnetic Faraday Effect at Microwave Frequencies and its Applications," Bell System Technical Journal, volume 31, page 1, January 1952. In arriving at Equation 2 a time dependence of $e^{j\omega t}$ was assumed for the radio frequency quantities involved. Due to this complex time factor, care must be taken when substituting Equation 2 in Equation 1, but when properly done it is found that double frequency terms in the magnetization are $$4\pi\dot{m}_z=-\tfrac{1}{2}jK\gamma(h_x^2+h_y^2) \qquad (3)$$

This equation shows that the rate of change of the $z$ component of magnetization is proportional to the square of the internal magnetic fields. Thus, if $h_x$ and $h_y$ vary at a frequency $\omega$ and if $h_x\neq\pm jh$ (i.e., the magnetic fields are not circularly polarized) $m_z$ varies at a frequency of $2\omega$. Since the $z$ component of magnetization has a component oscillating at a frequency of $2\omega$, the ferrite will radiate an electromagnetic wave of frequency $2\omega$. The equation also indicates that the output power level at the double frequency should vary as the square of the input peak power level at the fundamental frequency.

Apart from the equations just discussed, it is quite easy to see the reason for the generation of the double frequency magnetization. The magnetization of the body precesses about the direction of the D.C. field and can be thought of as a constant length vector whose projection on the appropriate plane determines $m_x$, $m_y$ and $m_z$. Since, in general, $m_x$, $m_y$ and $m_z$ are not equal, the magnetization must be precessing in an elliptical orbit as viewed along the D.C. field direction as shown in Fig. 1 of the drawings. But, since the magnetization vector must be of constant length, it is readily seen that the projection along the $z$ axis must have a component of radio frequency magnetization at double the frequency of the excitation fields. If $m_x$ and $m_y$ should have the same magnitude (which can occur if the excitation is circularly polarized) then no double frequency output would be expected, as illustrated in Fig. 2. It will be noted that this conclusion agrees with the results of Equation 3.

Employing the foregoing theory, the objects of the present invention are achieved by the placement of a ferrite element of rod, disk or slab form in a section of rectangular wave guide and means provided for magnetizing the ferrite element along the direction of the electric component of the microwave energy applied to the wave guide. Assuming that the device is intended to convert from X-band to K-band frequencies, the wave guide section is dimensioned to propagate energy at X-band frequency, and a constriction is provided in the E-plane at the input end to prevent harmonics generated by the ferrite from propagating toward the primary source. On the output side of the ferrite element, the wave guide is narrowed in the H-plane to form a guide with K-band dimensions, the latter guide being parallel to but rotated 90° relative to the X-band guide. Thus, all of the generated harmonic energy, particularly the K-band energy, must propagate out the K-band guide, which also filters out any X-band energy. The ferrite element may be of a variety of shapes and dimensions, and may be placed in a variety of positions within the guide, and still produce harmonic generation, although some combinations have been observed to be preferable to others. In a preferred embodiment, the ferrite element is in the form of an approximately semi-circular disk positioned on one of the narrows walls of the X-band guide. With this arrangement, a conversion efficiency of −6 db was consistently observed for a 32 kilowatt peak input at 9 kilomegacycles.

The nature of the invention, its application, and further objects and features of novelty will be better appreciated from the following detailed description of several embodiments taken in connection with the accompanying drawings in which:

Figs. 1 and 2 are diagrams referred to in the foregoing discussion of the theory of frequency conversion, and to which further reference will not be made;

Fig. 3 is a perspective view, partially diagrammatic and partially cut away, of frequency conversion apparatus in accordance with the invention illustrating one form and location of the ferrite element;

Figs. 3A, 3B, 3C and 3D are fragmentary perspective views of the ferrite-containing portion of the apparatus of Fig. 3 illustrating alternative forms and locations of the ferrite elements;

Figure 4:
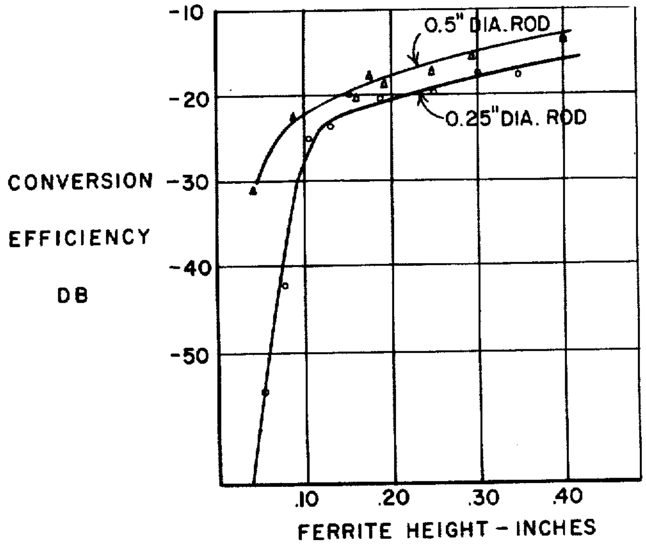
Fig. 4 is a curve showing frequency doubling conversion efficiency as a function of post height for two post diameters in the arrangement of Fig. 3.

Referring now to Fig. 3, and assuming that doubling from X-band to K-band is desired, it being understood that these frequencies are used here only by way of example and not in a limiting sense, an input signal is coupled from an X-band high power source 10 to one end of the frequency converter 12 of the invention, the harmonic generated within the converter being coupled from the other end to a load 14 or other suitable utilization equipment. Apparatus 12 includes a section of rectangular wave guide 16 dimensioned for X-band frequencies, the energy from source 10 preferably being coupled thereto in the $TE_{01}$ mode; i.e., with the E-vector normal to the broad walls of the guide. A ferrite element 18, shown as a circular cylindrical post, is disposed within the guide 16 and preferably extends a substantial portion of the distance between the broad walls of the guide. In this embodiment, the post is positioned substantially equidistantly between the narrow walls of guide

16 and means (not shown) are provided for producing a unidirectional magnetic field within element 18 in the direction indicated by the arrow marked "$H_{d.c.}$". The magnetic field producing means may be either a permanent magnet or an electromagnet arranged with its pole pieces disposed as closely adjacent the ferrite element as practicable, to produce the D.C. magnetization in the ferrite in a direction parallel to the E-vector of the incident S-band energy. While external means for producing magnetization within the ferrite has been suggested and can be expected to be the more usual case, it is within the contemplation of the invention to employ ferrite materials which themselves are permanent magnets and possess their own internal magnetization in the direction indicated. The ferrite element 18, when excited by incident X-band energy whose E-vector is parallel to $H_{d.c.}$, generates double frequency (K-band) energy having an electric field vector perpendicular to the direction of the internal magnetic field; i.e., in the H-plane of the X-band wave guide 16. A constriction in the E-plane of guide 16, which may be formed of a pair of conductive slabs **20*a* and 20*b* secured to the broad walls of the guide and extending across the width of the guide, prevents the K-band energy generated by the ferrite from propagating toward the source 10**. The ends of the slabs are preferably stepped as shown to minimize reflections, the gap between the slabs permitting the transmission therethrough of X-band energy but providing cut-off for K-band energy.

On the load side of element 18, the X-band guide is narrowed in the H-plane, through a stepped transition 22 to minimize reflections, to a wave guide 24 of K-band dimensions. The guide 24 conveniently is a coaxial extension of the X-band guide but is rotated 90° relative to the X-band guide. It will be noted that with this orientation, the E-vector of the K-band energy generated by the ferrite is normal to the broad walls of the K-band guide 24 whereby the K-band energy is readily propagated therethrough. All of the K-band energy must propagate out through this guide, the dimensions and orientation thereof also serving to filter out any X-band energy.

To enhance the output of K-band energy, a phase shifter for K-band energy is preferably located in the X-band guide 16 on the generator side of the ferrite element 18. The phase shifter may comprise a slab 26 of dielectric material, such as polystyrene, positioned in the H-plane of the X-band guide and having tapered ends to minimize reflections. The slab is mounted on threaded dielectric rods, diagrammatically illustrated as cylindrical posts, which extend through the upper broad wall of guide 16. Dielectric nuts (not shown) or the like on these rods permit adjustment (indicated by the double-ended arrows) of slab 26 to an optimum position between the broad walls. The slab 26 is oriented parallel to the broad walls because the harmonics generated by the ferrite element 18 are orthogonally polarized relative to the incoming waves from source 10. The slab functions to alter the phase of the harmonic waves which are propagated from ferrite element 18 back toward constriction 20 in such a manner that the harmonic waves which are reflected forwardly from section 20 will be in phase with and therefore will enhance the harmonic waves that propagate forwardly from ferrite element 18. Section 20 provides a cut-off for most of the harmonic energy, the latter being reflected forwardly, and it is the phase adjustment of this reflected portion that is affected by slab 26.

A number of ferrite materials have the property of generating double frequency signals when employed in the manner described, some, however, performing better than others. As between Ferramic R–1 and Ferroxcube 106, for example, Ferramic R–1 gave the best conversion efficiency. The conversion efficiency of the ferrite is also dependent on the size and geometry of the ferrite element. In Fig. 4 is plotted data for centered right circular cylinders (posts) of the form shown in Fig. 3 to show the effect of post height (distance from the lower broad wall to the top of the post) for posts having diameters of ¼" and ½". It will be noted that the conversion efficiency improves as post height increases and as post diameter increases. For large post heights, apparently the output does not change appreciably when the diameter of the post is changed.

Applicants have investigated a number of other geometries and configurations for the ferrite element, typical arrangements being illustrated in Figs. 3A through 3D. In Fig. 3A, the ferrite element 18*a* is in the form of a thin cylindrical rod disposed with its longitudinal axis substantially coincident with the central axis of the rectangular wave guide 16, it being understood that the illustrated section corresponds to the like section in Fig. 3. As in Fig. 3, and in the other embodiments to be described, means (not shown) are provided to produce a unidirectional magnetic field through the ferrite element in a direction parallel to the narrow walls of wave guide 16; i.e. parallel to the E-vector of the incident fundamental frequency energy, as indicated by the arrow marked "$H_{d.c.}$."

Fig. 3B illustrates another alternative, wherein two ferrite elements are used, each comprising a thin rectangular slab 18*b* positioned vertically against the narrow walls of the wave guide. The arrangement of Fig. 3C is similar to Fig. 3B except that a single rectangular slab 18*c* is vertically centered in the wave guide.

Of the arrangements investigated, the best results were observed with the geometry of Fig. 3D wherein the element 18*d* is an approximately semi-circular segment of a ½" diameter 0.20" thick disk formed of Ferramic R–1 and mounted with the flat side against one narrow wall of the guide 16, substantially equidistant between the broad walls. Apart from the improvement in conversion efficiency which results from this geometry (to be discussed hereinbelow) the location at one side of the guide simplifies the problem of producing a suitable magnetic field within the ferrite. Another important advantage resulting from this location is that heat is readily conducted from the ferrite element through the wall of the guide to which it is secured. In the conversion process, a certain amount of energy is absorbed by the ferrite, raising its temperature and altering the intrinsic properties of the material. At high input powers, elevation of the temperature may alter the characteristics of the ferrite to such an extent that the conversion efficiency drops to an impractical level. Consequently, the efficient conduction of heat from the ferrite is an important consideration in maintaining a wide useful range of operability for the device.

Figure 5:
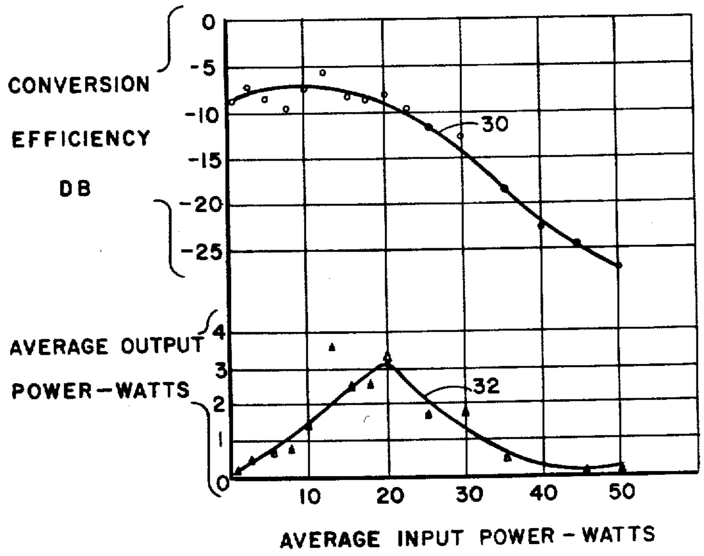
Fig. 5 is a curve showing frequency doubling conversion efficiency and average power output as a function of average input power for the ferrite geometry and position shown in Fig. 3D.

With the geometry illustrated in Fig. 3D, conversion efficiencies of −6 db were consistently observed for a 32 kilowatt peak input at 9 kilomegacycles, the curve 30 of Fig. 5 showing that the conversion efficiency falls off as the average input power is increased. In arriving at conversion efficiency, the curve of output power versus average input power was measured by maintaining a constant peak power level while increasing the pulse repetition frequency. When this is done, it is seen that the peak power output increases slightly and then falls off considerably as the average power is raised, this being due to changes in the intrinsic properties of the ferrite material with increase in temperature. It will be seen from the average output power level curve 32 of Fig. 5 that the average power output increases to a maximum of 3 watts at 18 kilomegacycles for an average input power of 20 watts at 9 kilomegacycles. For a greater input power, the output decreases because of heating of the ferrite.

Figure 6:
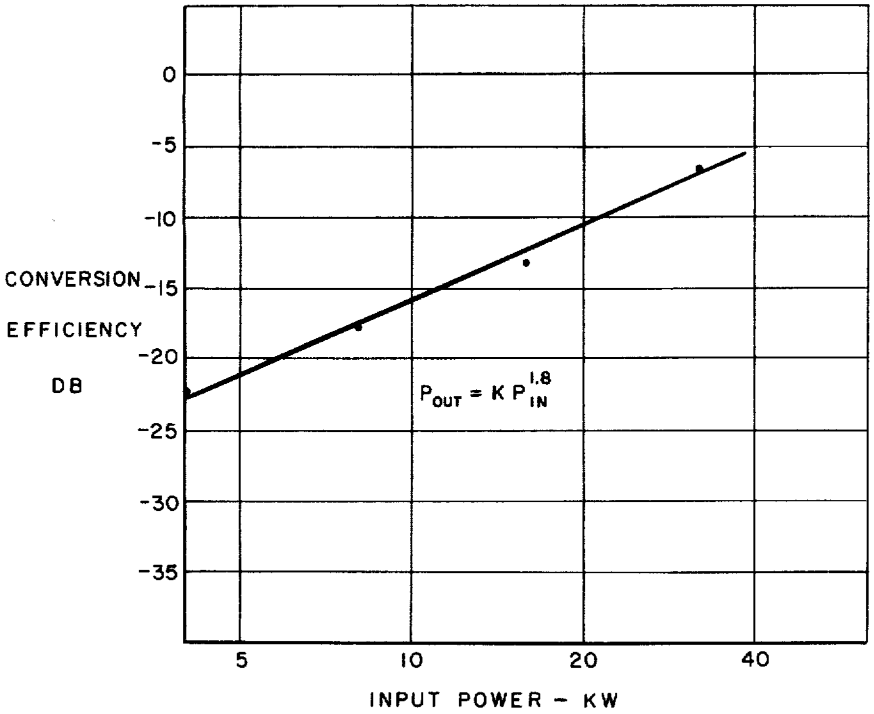
Fig. 6 is a curve showing the relationship between peak power output and peak power input of the apparatus of Fig. 3.

Fig. 6 shows a curve of the peak power output versus peak power input for the ferrite geometry and location illustrated in Fig. 3D which indicates that the ferrite operates according to a 1.8 law. At low power levels the doubler acts as a square law device. The deviation from the square law suggests that a large percentage of energy is transferred to higher order harmonics at the higher inputs, and indeed the presence of these higher order harmonics have been measured by applicants.

In all of the devices discussed above, when an input signal of a first frequency is applied, the ferrite is effective to produce a second, or higher harmonic of the input frequency in the manner indicated. Being a non-linear device, and as discussed in applicants' earlier application, each of the herein described embodiments will also function as a mixer. That is, if the two signals of different fixed frequencies are coupled to the generator end of wave guide 16 (simply by adding another generator) mixing action will occur so long as the magnetic field components of the two signals are perpendicular to the internal magnetic field of the ferrite. The interaction of the two waves in the ferrite produce a third wave having its magnetic field component directed parallel to the internal field. The third wave contains the various frequency components normally produced during frequency mixing; i.e., the sum, difference, and products of the frequencies of the input signals. It should be noted also that similar mixing action will occur if a single complex signal containing two different frequency components are applied to the generator end of the device of Fig. 3.

To summarize, the ferrite frequency doubler of the present invention has capabilities and advantages not possessed by available devices. At high peak powers, frequency doubling in ferrites is more efficient than low power doubling in crystals or available electron tubes, the ferrite will withstand higher average power, and the ferrite is not irreparably damaged if overloaded. The apparatus of the invention provides a practical means for frequency doubling, and is also capable of generating measurable power at higher order harmonics than the second, and is operable to mix two signals of differing frequencies. Frequency changing occurs in a variety of ferrite materials and geometries, depending on the shape and dimensions as well as the position of the element in the wave guide structure.

While there have been shown and described several embodiments of applicants' invention, it will be apparent to those skilled in the art that many modifications and variations can be made within the scope and spirit of the invention as defined in the appended claims.

What is claimed is:

1. Apparatus for converting the frequency of microwave electromagnetic energy from a predetermined frequency to an harmonic of said predetermined frequency comprising, a first section of rectangular wave guide having broad and narrow walls, an E-plane constriction in one end of said first wave guide section constructed and arranged to propagate energy at said predetermined frequency but to prevent propagation of energy at harmonics of said predetermined frequency, a ferrite element positioned within said first wave guide section, means for producing a unidirectional magnetic field within said element in a direction parallel to said narrow walls, means for coupling to said one end of said first wave guide section electromagnetic energy at said predetermined frequency and having its electric component normal to said narrow walls, said ferrite element when thus magnetized and excited being operative to yield electromagnetic energy at harmonics of said predetermined frequency whose electric component is normal to said narrow walls, and a second section of rectangular wave guide coaxially joined to the other end of said first wave guide section and dimensioned to propagate energy at one or more of said harmonic frequencies and to prevent transmission of energy at said predetermined frequency, said second wave guide section being rotated 90° relative to said first wave guide section.

2. Apparatus in accordance with claim 1 wherein said ferrite element comprises a thin semi-circular disk secured along its diameter to a narrow wall of said first wave guide section and disposed in a plane substantially parallel to and equidistant from the broad walls.

3. Apparatus in accordance with claim 1 wherein said ferrite element comprises a cylindrical post centrally spaced between the narrow walls of said first wave guide section and arranged with its longitudinal axis normal to the broad walls.

4. Apparatus in accordance with claim 1 wherein said ferrite element comprises a thin cylindrical rod disposed substantially along the central longitudinal axis of said first wave guide section.

5. Apparatus in accordance with claim 1 wherein said ferrite element comprises a rectangular slab vertically disposed substantially along the central longitudinal axis of said first wave guide section.

6. Apparatus in accordance with claim 1 and including a tunable phase shifter disposed within said first wave guide section between said constriction and said ferrite element.

7. Apparatus for mixing two microwave signals of differing frequencies comprising, a first section of rectangular wave guide having broad and narrow walls, an E-plane constriction in one end of said first wave guide section constructed and arranged to propagate energy at the frequency of said signals and to prevent propagation of energy at a frequency equal to the sum of said frequencies, a ferrite element positioned within said first wave guide section, means for producing a unidirectional magnetic field within said element in a direction parallel to said narrow walls, means for coupling to said one end of said first wave guide section first and second microwave signals of differing frequency and each having its electric component normal to said broad walls, said ferrite element when thus magnetized and excited being operative to yield a microwave signal having a frequency equal to the sum of the frequencies of said first and second signals and having its electric component normal to said narrow walls, and a second section of rectangular wave guide coaxially joined to the other end of said first wave guide section and dimensioned to propagate energy at said sum frequency and to prevent transmission of energy at the frequencies of said first and second signals, said second wave guide section being rotated 90° relative to said first wave guide section.

8. Apparatus in accordance with claim 7 wherein said ferrite element comprises a thin semi-circular disk secured along its diameter to a narrow wall of said first wave guide section and disposed in a plane substantially parallel to and equidistant from the said broad walls.

9. Apparatus in accordance with claim 7 wherein said ferirte element comprises a cylindrical post centrally spaced between the narrow walls of said first wave guide section and arranged with its longitudinal axis normal to said broad walls.

10. Apparatus in accordance with claim 7 wherein said ferrite element comprises a thin cylindrical rod disposed substantially along the central longitudinal axis of said first wave guide section.

11. Apparatus in accordance with claim 7 and including a tunable phase shifter disposed within said first wave guide section between said constriction and said ferrite element.

12. Apparatus for converting the frequency of microwave electromagnetic energy from a predetermined frequency to an harmonic of said predetermined frequency comprising, a first section of rectangular wave guide having broad and narrow walls, means in one end of said first wave guide section constructed and arranged to propagate energy at said predetermined frequency but to prevent propagation of energy at harmonics of said predetermined frequency, a ferrite element positioned within said first wave guide section, means for producing a unidirectional magnetic field within said element in a direction parallel to said narrow walls, means for coupling to said one end of said first wave guide section electromagnetic energy at said predetermined frequency and having its electric component normal to said narrow walls, said ferrite element when thus magnetized and excited being operative to yield electromagnetic energy at harmonics of said predetermined frequency whose electric component is normal to said narrow walls, and a second section of rectangular wave guide coaxially joined to the other end of said first wave guide section and dimensioned and oriented to propagate energy at one or more of said harmonic frequencies and to prevent transmission of energy at said predetermined frequency.

13. Apparatus for converting the frequency of microwave electromagnetic energy from a predetermined frequency to an harmonic of said predetermined frequency comprising, a first section of rectangular wave guide having broad and narrow walls, a constriction in one end of said first wave guide section constructed and arranged to propagate energy at said predetermined frequency but to prevent propagation of energy at harmonics of said predetermined frequency, a ferrite element positioned within said first wave guide section, means for producing a unidirectional magnetic field within said element in a direction parallel to said narrow walls, means for coupling to said one end of said first wave guide section electromagnetic energy at said predetermined frequency and having its electric component normal to said narrow walls, said ferrite element when thus magnetized and excited being operative to yield electromagnetic energy at harmonics of said predetermined frequency whose electric component is normal to said narrow walls, and a second section of rectangular wave guide coaxially joined to the other end of said first wave guide section and rotated 90° with respect thereto and dimensioned to propagate energy at one or more of said harmonic frequencies and to prevent transmission of energy at said predetermined frequency.

14. Apparatus for mixing two microwave signals of differing frequencies comprising, a first section of rectangular wave guide having broad and narrow walls, means in one end of said first wave guide section constructed and arranged to propagate energy at the frequency of said signals and to prevent propagation of energy at a frequency equal to the sum of said frequencies, a ferrite element positioned within said first wave guide section, means for producing a unidirectional magnetic field within said element in a direction parallel to said narrow walls, means for coupling to said one end of said first wave guide section first and second microwave signals of differing frequency and each having its electric component normal to said broad walls, said ferrite element when thus magnetized and excited being operative to yield a microwave signal having a frequency equal to the sum of the frequencies of said first and second signals and having its electric component normal to said narrow walls, and a second section of rectangular wave guide coaxially joined to the other end of said first wave guide section and dimensioned and oriented to propagate energy at said sum frequency and to prevent transmission of energy at the frequencies of said first and second signals.

15. Apparatus for mixing two microwave signals of differing frequencies comprising, a first section of rectangular wave guide having broad and narrow walls, a constriction in one end of said first wave guide section constructed and arranged to propagate energy at the frequency of said signals and to prevent propagation of energy at a frequency equal to the sum of said frequencies, a ferrite element positioned within said first wave guide section, means for producing a unidirectional magnetic field within said element in a direction parallel to said narrow walls, means for coupling to said one end of said first wave guide section first and second microwave signals of differing frequency and each having its electric component normal to said broad walls, said ferrite element when thus magnetized and excited being operative to yield a microwave signal having a frequency equal to the sum of the frequencies of said first and second signals and having its electric component normal to said narrow walls, and a second section of rectangular wave guide coaxially joined to the other end of said first wave guide section and rotated 90° relative thereto and dimensioned to propagate energy at said sum frequency and to prevent transmission of energy at the frequencies of said first and second signals.

References Cited in the file of this patent

UNITED STATES PATENTS

| | | |
|---|---|---|
| 2,629,079 | Miller | Feb. 17, 1953 |
| 2,745,069 | Hewitt | May 8, 1956 |
| 2,748,352 | Miller | May 29, 1956 |
| 2,748,353 | Hogan | May 29, 1956 |
| 2,798,205 | Hogan | July 2, 1957 |
| 2,802,184 | Fox | Aug. 6, 1957 |

OTHER REFERENCES

Frequency Doubling Ferrites, by Ayres et al., in Journal of Applied Physics, February 1956, pp. 188–189.